United States Patent [19]
Wilson et al.

[11] 3,892,878
[45] July 1, 1975

[54] FLAVORING WITH SULFUR CONTAINING COMPOUNDS

[75] Inventors: Richard A. Wilson, Westfield; Christopher Giacino, Califon, both of N.J.

[73] Assignee: International Flavors & Fragrances Inc., New York, N.Y.

[22] Filed: Apr. 25, 1973

[21] Appl. No.: 354,304

[52] U.S. Cl. .................. 426/534; 426/589; 426/203; 426/221; 426/222; 426/531; 260/609 R
[51] Int. Cl. ............................................. A23l 1/26
[58] Field of Search ............. 426/65, 175, 221, 222, 426/342; 260/609 R

[56] References Cited
UNITED STATES PATENTS

| | | | |
|---|---|---|---|
| 3,043,880 | 7/1962 | Fournier et al. | 260/609 R |
| 3,394,016 | 7/1968 | Bidmead et al. | 426/250 |
| 3,653,920 | 4/1972 | Brinkman et al. | 426/65 |
| 3,713,848 | 1/1973 | Katz et al. | 426/65 |
| 3,773,524 | 11/1973 | Katz et al. | 426/65 |

*Primary Examiner*—Raymond N. Jones
*Assistant Examiner*—Esther L. Massung
*Attorney, Agent, or Firm*—Brooks Haidt Haffner & Delahunty

[57] ABSTRACT

The flavor of a foodstuff is altered by use of an alkane dithiol, mercaptoalkanol, alkane dimercapto sulfide or alkane hydroxy mercapto sulfide of the formula

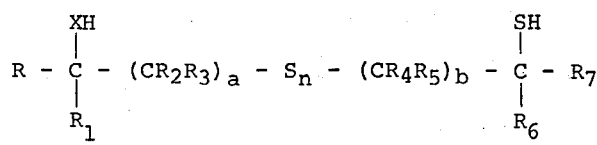

or

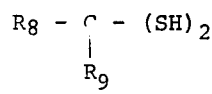

wherein X is oxygen or sulfur, $n$ is 0 or 1, $R$-$R_9$ are the same or different and each is hydrogen or lower alkyl of 1–4 carbon atoms, and at least one of $R_8$ or $R_9$ is such lower alkyl; $a$ and $b$ are the same or different and each represents an integer of from 0 to 10 when $n$ is 0; and when $n$ is 1, $a$ and $b$ are the same or different and each represents an integer of from 1 to 10.

14 Claims, No Drawings

FLAVORING WITH SULFUR CONTAINING COMPOUNDS

BACKGROUND OF THE INVENTION

This invention has to do with altering the organoleptic properties of foodstuffs. More particularly, the invention relates to the use of certain alkane dithiols mercapto alkanols, alkane dimercapto sulfides or alkane hydroxy mercapto sulfides to alter the flavor characteristics of a foodstuff. Contemplated are processes and compositions for altering the flavor of foodstuffs.

The term "alter" in its various forms is used herein to mean the supplying or imparting of a flavor or aroma characteristic or note to an otherwise bland, relatively tasteless or non-odorous substance, or augmenting an existing flavor or aroma characteristic where the natural flavor or intrinsic odor is deficient in some regard, or supplementing the existing flavor or aroma impression to modify its quality, character, taste or aroma.

The term "foodstuff" as used herein includes both solid and liquid ingestible materials which usually do, but need not have nutritional value. Thus, foodstuffs include meats, gravies, soups, convenience foods, beverages, dairy products, candies, vegetables, cereals, soft drinks, snacks and the like.

The reproduction of roasted meat, vegetable flavors, poultry flavors and other roasted flavors has been the subject of a long and continuing search by those engaged in the production of foodstuffs. The shortage of foods, especially protein foods, in many parts of the world has given rise to a need for utilizing non-meat sources of protein and for making such protein as palatable and meat-or poultry-like as possible. In addition, various techniques utilized in processing food detract from their flavor quality or give rise to off-flavors. Convenience or "snack" foods are increasing in volume and they require flavoring. Accordingly, materials capable of closely simulating, improving, or even exactly duplicating the flavor and aroma of roasted products and meat, poultry and vegetable products have long been sought.

PRIOR ART

Various alkane thiols and alkane mercapto sulfides have been suggested as flavoring agents. Thus, U.S. Letters Pat. No. 3,653,920 which issued on Apr. 4, 1972 states that certain alkane thiol sulfides, such as 2-thiobutane thiol, can be used to impart a meat flavor to foods; and United States application Ser. No. 135,377, filed Apr. 19, 1971, describes various branched chain alkane thiols, such as 2-methyl-3-butane thiol, and suggests their use for imparting roasted meat aroma and taste. None of these compounds are alkane dithiols or mercapto alkanols, however.

SUMMARY OF THE INVENTION

In accordance with this invention a new class or classes of sulfur-containing compounds, various alkane dithiols, mercapto alkanols, alkane dimercapto sulfides and alkane hydroxy mercapto sulfides have been provided for altering the meat, poultry, vegetable or other roasted flavor of foodstuffs. Suitable sulfur containing compounds found useful in this regard may be represented by

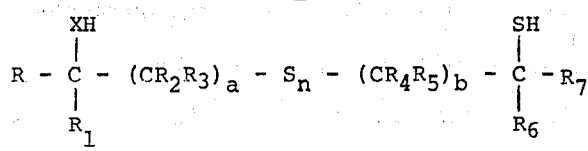

or

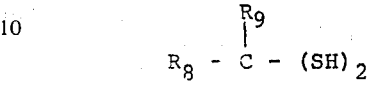

wherein X is oxygen or sulfur, $n$ is 0 or 1, each of R, $R_1$, $R_2$, $R_3$, $R_4$, $R_5$, $R_6$, $R_7$, $R_8$, and $R_9$ is the same or different and each is hydrogen or lower alkyl of 1 through 4 carbon atoms, and at least one of $R_8$ and $R_9$ is said alkyl; $a$ and $b$ are the same or different and each represents an integer of from 0 through 10 when $n$ is 0; and, when $n$ is 1, $a$ and $b$ are the same or different and each represents an integer of from 1 to 10.

Among the alkane dithiols found especially useful are 3,3-dimethyl-2,2-butane dithiol and those of the formula

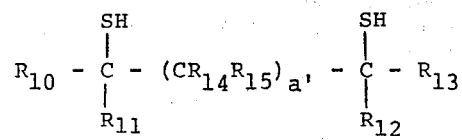

wherein $a'$ is 0 through 7, each of $R_{10}$ through $R_{15}$ is the same or different and each is hydrogen or lower alkyl of from 1 to 3 carbon atoms. Included among such alkane mercapto thiols are:

1,2-ethane dithiol
1,2-propane dithiol
1,3-butane dithiol
2,3-butane dithiol
1,3-propane dithiol
1,6-hexane dithiol
1,4-butane dithiol
1,4-pentane dithiol
1,2-butane dithiol
1,9-nonane dithiol
1,8-octane dithiol
1,5-pentane dithiol
2,4-pentane dithiol
3-methyl-1,5-pentane dithiol
2-methyl-1,3-butane dithiol Among the alkane dimercapto sulfides and alkane hydroxy mercapto sulfides especially found suitable according to this invention are those represented by the formula

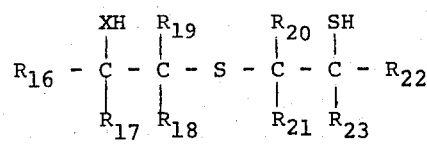

wherein X is sulfur or oxygen, and each of $R_{16}$ through $R_{23}$ is the same or different and hydrogen or lower alkyl of from 1–3 carbon atoms, preferably methyl. Such alkane dimercapto sulfides and alkane hydroxy mercapto sulfides include:

1. di-α-methyl-β-mercapto propyl sulfide

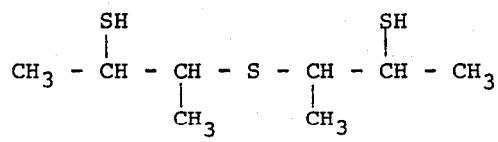

2. α-methyl-β-mercapto-propyl-α'-methyl-β'-hydroxy propyl sulfide

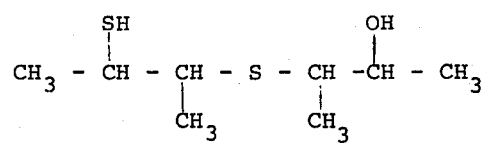

3. 2-mercaptoethyl sulfide

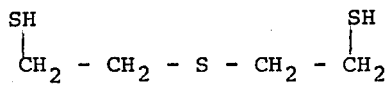

Among the mercapto alkanols found especially suitable are those represented by the formula

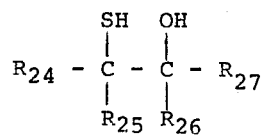

wherein each of $R_{24}$ through $R_{27}$ is the same or different and each is hydrogen or lower alkyl of from 1 through 3 carbon atoms, and preferably methyl. A particularly preferred mercapto alkanol is 2-mercapto-3-butanol.

DESCRIPTION OF THE PREFERRED EMBODIMENTS

The alkane dithiols, mercapto alkanols, alkane dimercapto sulfides and alkane hydroxy mercapto sulfides of this invention are primarily useful in meat and poultry flavor compositions although they may also be used in dairy and fruit flavors. They are especially suitable as flavors by reason of the wide range of useful concentrations at which they can be applied. Most flavor chemicals become objectionable in character at some point not too greatly above their threshold value. The alkane dithiols, mercapto alkanols, alkane dimercapto sulfides and alkane hydroxy mercapto sulfides of the present invention have been found to be still suitable and inoffensive at proportions well in excess of their threshold value and substantially above the multiple of their threshold at which other flavor chemicals are objectionable.

The threshold value of the alkane dithiols, mercapto alkanols, alkane dimercapto sulfides and alkane hydroxy mercapto sulfides may range from 0.002 parts per million to 0.2 parts per million and, therefore, normally would be used at levels of from about 0.002 parts per million to about 10 parts per million, but can actually be used without imparting an objectionable character up to about 20 parts per million based on the total weight of the foodstuff.

The actual amount used will vary depending upon a variety of factors including the particular flavoring agent used, the flavor effect desired, cost considerations, the amount and type of other ingredients present, the foodstuff to be flavored and the processing and storage conditions to which the foodstuff will be subjected. It should be kept in mind that larger concentrations do not necessarily give equivalent incremental flavor enhancement. In those instances where the alkane dithiols, mercapto alkanols, alkane dimercapto sulfides and alkane hydroxy mercapto sulfides are added to the foodstuff as an essential and integral part of a flavoring composition, it is necessary that the total quantity of flavoring composition employed be sufficient to yield an effective alkane dithiol, mercapto alkanol, alkane dimercapto sulfide and alkane hydroxy mercapto sulfide concentration, i.e. sufficient to alter the organoleptic characteristics to which it is added or incorporated.

Suitable alkane dithiols, mercapto alkanols, alkane dimercapto sulfides and alkane hydroxy mercapto sulfides according to this invention are shown in the following tabulation which includes a description of the flavor character of the compound at a typical use concentration noted in parts per million (ppm).

TABLE I

| COMPOUND | FLAVOR CHARACTER | USE CONCENTRATION (PPM) |
| --- | --- | --- |
| 1,2-ethane dithiol | roasted meat | 0.5 |
| 1,2-propane dithiol | bloody, tangy | 0.5 |
| 1,3-butane dithiol | serumy | 0.15 |
| 2,3-butane dithiol | stewed beef | 0.15 |
| 1,3-propane dithiol | skunky potent | 0.05 |
| 1,6-hexane dithiol | fatty, chicken, raw dirty | 0.05 |
| 1,4-butanedithiol | metallic, garlic chemical | 0.01 |
| 3,3-dimethyl-2,2-butane dithiol | eggy | 0.25 |
| 1,2-butane dithiol | sweet, soft, grassy, meaty | 0.05 |
| 1,4-pentane dithiol | metallic, garlic, chemical, harsh | 0.05 |
| 1,9-nonane dithiol | burnt meaty | 0.5 |
| 1,8-octanedithiol | fatty, slightly roasted, chicken, dirty | 0.05 |
| 1,5-pentane dithiol | sulfury, roasted meat | 0.1 |
| 2-mercapto-3-butanol | sweet, meat, stew-like | 0.5 |

TABLE I – Continued

| | | |
|---|---|---|
| Di-α-methyl-β-mercapto propyl sulfide | light roasted meat | 1.0 |
| α-methyl-β-mercapto-propyl-α'-methyl-β'-hydroxy propyl sulfide | roasted meat | 1.0 |
| 2-mercaptoethyl sulfide | sweet, roasted | 0.5 |
| 2,4-pentane dithiol | roast meat, metallic, allium | 0.15 |
| 3-methyl-1,5-pentane dithiol | metallic, liver-like | 0.15 |
| 2-methyl-1,3-butane dithiol | meaty, roasted, onion | 0.15 |

The alkane dithiols, mercapto alkanols, alkane dimercapto sulfides and alkane hydroxy mercapto sulfides contemplated as flavoring agents by the present invention are old compounds and may be prepared by conventional or analogous techniques. For example, 2,3-butane dithiol is prepared by reacting 2,3-epoxy butane with ammonium thiocyanate at room temperature and atmospheric pressure to obtain 2,3-epithiobutane which, in turn, is treated with sodium hydrosulfide in a solvent (e.g. ethanol) and the 2,3-butane dithiol obtained is recovered. Di-α-methyl-β-mercapto-propyl sulfide and α-methyl-β-mercapto propyl-α'-methyl-β'-hydroxy propyl sulfide as well as 2-mercapto-3-butanol are also obtained in this reaction, though in minor proportion to 2,3-butanedithiol. The alkane dithiol, 1,4-pentane-dithiol, is prepared by reacting 1,4-dibromopentane with thiourea at elevated temperature and then treating the reaction product with an alkalimetal hydroxide such as potassium hydroxide to obtain the desired product. The alkane dithiol 3,3-dimethyl-2,2-butane dithiol is prepared by reacting 3,3-dimethyl-butane-2-one with hydrogen sulfide at low temperature ($-5°$ to $+5°C$) in the presence of dry hydrogen chloride, and the desired product is recovered.

The alkane dithiols, mercapto alkanols, alkane dimercapto sulfides and alkane hydroxy mercapto sulfides described herein may be employed either singly or in admixtures comprising two or more thereof. Admixtures of two or more alkane dithiols, mercapto alkanols, alkane dimercapto sulfides and alkane hydroxy mercapto sulfides offer the advantages of combining the beneficial and organoleptic qualities of each of the compounds into a total impact which is superior or different from the characteristics of the sole ingredient. The formulator can simulate a wide variety of organoleptic characteristics to evoke a predetermined taste response on the part of the consumer.

Generally in use the alkane dithiols, mercapto alkanols, alkane dimercapto sulfides and alkane hydroxy mercapto sulfides are admixed with one or more auxiliary flavoring adjuvants. The precise adjuvants employed will depend upon the ultimate use contemplated and the organoleptic character desired. Flavoring adjuvants are recognized in the art and are ingestibly acceptable or non-toxic. Such flavoring adjuvants include stabilizers, thickeners, surface active agents, conditioners, flavorants and flavor intensifiers.

Stabilizers include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickeners include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; and proteinaceous materials such as gelatin; lipids, carbohydrates; starches; pectins and emulsifiers, e.g., mono- and diglycerides of fatty acids.

Surface active agents include emulsifying agents, e.g. fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents, e.g., sodium acetate, ammonium bicarbonate, ammonium phosphate, citric acid, lactic acid, vinegar and the like; colorants, e.g., carminic acid, cochineal, tumeric and curcunin and the like; firming agents such as alluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like; riboflavin vitamins; zinc sources such as zinc chloride, zinc sulfate and the like.

Flavorants and flavor intensifiers include organic acids, e.g., fatty saturated, unsaturated and amino acids; alcohols, e.g., primary and secondary alcohols; esters; carbonyl compounds including aldehydes and ketones; lactones; cyclic organic materials including benzene derivatives; alicyclics, heterocyclics such as furans, pyridines, pyrazines and the like; sulfur-containing materials including thiazoles, thiols, sulfides, disulfides and the like; so-called flavor potentiators such as monosodium glutamate, guanylates, inosinates; natural and synthetic flavorants such as vanillin, natural gums and the like; spices; herbs; essential oils and extractives including anise, anise oil, alkanet root extract, bay leaves, capsicum extract and the like.

The specific flavoring adjuvant selected for use may be either solid or liquid, depending upon the desired physical form of the ultimate product, i.e., foodstuff, whether simulated or natural, and should, in any event, be capable of providing an environment in which the alkane dithiols, mercapto alkanols, alkane dimercapto sulfides and alkane hydroxy mercapto sulfides can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contra-distinction, in the preparation of solid products, e.g., simulated foodstuffs, ingredients capable of providing normally solid compositions should be selected such as various cellulose derivatives.

The preferred flavoring adjuvants which are used in combination with at least one alkane dithiol, mercapto alkanol, alkane dimercapto sulfide and alkane hydroxy mercapto sulfide include: 4-methyl-5-($\beta$-hydroxy ethyl)thiazole, ethyl thioacetate, furfural, benzaldehyde, methional, hexanal, diacetyl, amyl alcohol, ethyl disulfide, methyl mercaptan, 2,4-decadienal, 2,4-decadienol, 2,5-dimethyl-2,5-dihydroxy-1,4-dithiane, 1,3-dithiolane, 2-methyl-1,3-dithiolane, 3,5-dimethyl-1,2-dithiolane, 3-methyl-1,2-dithiolane, 2,4-dimethyl-1,3-dithiolane, 4-methyl-1,3-dithiolane, 1,2-dithiane, 1,3-dithiane, 1,4-dithiane, 2-methyl-1,3-dithiane, 2,4-dimethyl-1,3-dithiane, 4-methyl-1,3-dithiane, 2,4,6-trimethyl-1,3-dithiane, thiamine hydrochloride, 2-methyl-1-butanethiol, 4-mercapto-2-butanone, 3-mercapto-2-pentanone, furfuryl alcohol, 2-mercapto propionic acid, methyl pyrazine, 2-ethyl-3-methyl pyrazine, tetrahydrofurfuryl alcohol, tetrahydrothiophen-3-one, tetramethyl pyrazine, dipropyl disulfide, methyl benzyl disulfide, 2-butyl thiophene, 2,3-dimethyl thiophene, 5-methyl furfural, 3-acetyl-2,5-dimethylfuran, guaiacol, phenyl acetaldehyde, $\gamma$-decalactone, d-limonene, acetoin, amyl acetate, maltol, ethyl butyrate, levulinic acid, piperonal, ethyl acetate, n-octanal, n-pentanal, 2-isobutyl thiazole, propyl propenyl disulfide, propyl propenyl trisulfide, 2,6-dimethyl pyrazine, acetophenone, 2-methyl-2-butenal, furfuryl mercaptan, acetyl propionyl.

Flavoring compositions prepared in accordance with the present invention preferably contain alkane dithiol, mercapto alkanol, alkane dimercapto sulfide and alkane hydroxy mercapto sulfide in concentrations ranging from about $2 \times 10^{-9}$ to 25% by weight, based on the total weight of said flavoring compositions, but may contain as much as 80 or 90% by weight of the alkane dithiol, mercapto alkanol, alkane dimercapto sulfide and alkane hydroxy mercapto sulfide compound, if the flavoring composition is then applied in small amount.

All parts, proportions, percentages and ratios herein are by weight unless otherwise indicated.

It will be understood by those skilled in the art that the alkane dithiol, mercapto alkanol, alkane dimercapto sulfide and alkane hydroxy mercapto sulfide can be added to the materials to be flavored or aromatized at any convenient point in the production of the consumable material by any of the conventional techniques including spray drying, blending, stirring, dissolving and the like. Thus, when they are used to alter or otherwise vary the flavor of a foodstuff, they can be added in the original mixture, emulsion, preparation, or the like, prior to any cooking or heating operation. Alternatively, they can be added at a later stage of processing if volatilization losses would be excessive during the earlier processing.

The following examples are given to illustrate embodiments of the invention as it is now preferred to practice it. It will be understood that these examples are illustrative, and the invention is not to be considered as restricted thereto except as indicated in the appended claims.

EXAMPLE I

The following materials are homogeneously admixed at 25°C:

| Ingredients | Parts |
| --- | --- |
| Furfural | 1.0 |
| Benzaldehyde | 0.5 |
| Methional | 1.0 |
| n-Hexanal | 3.0 |
| 2,4-Decadienal | 5.0 |
| 1,6-hexanedithiol | 25.0 |
| Ethanol (95% aqueous) | 63.5 |

The resulting mixture has an excellent chicken aroma with pleasant fatty nuances.

EXAMPLE II

The composition prepared in Example I is dissolved in propylene glycol to provide an 0.1% solution. This solution in the amount of 0.966g is added to 7.3g of a soup base consisting of:

| Ingredients | Parts |
| --- | --- |
| Fine ground sodium chloride | 35.62 |
| Hydrolyzed vegetable protein | 27.40 |
| Monosodium glutamate | 17.81 |
| Sucrose | 10.96 |
| Chicken fat | 5.46 |
| Caramel color | 2.73 |

The resulting mixture is added to 12 ozs. of boiling water to obtain a soup having an excellent chicken flavor.

EXAMPLE III

The following are homogeneously admixed at 77°F:

| Ingredients | Parts |
| --- | --- |
| Vegetable shortening | 622.7 |
| Salt | 321.7 |
| Glutamic acid | 5.1 |
| L-Cysteine Hydrochloride | 10.3 |
| Glycine | 5.1 |
| $\beta$-Alanine | 1.3 |
| Taurine | 20.0 |
| Mixture of di-sodium inosinate and di-sodium guanylate | 3.3 |
| 1,4-Pentanedithiol | 0.05 ppm |

This mixture is heated to 300°F for 30 seconds. After cooling to 100°F, 0.12 part of diacetyl and 0.10 part of hexanal are added. The resulting mixture has an excellent roasted sulfury meat note.

EXAMPLE IV

The following materials are homogeneously mixed at 77°F:

| Ingredients | Parts |
| --- | --- |
| Vegetable shortening | 622.7 |
| Salt | 321.7 |
| Glutamic acid | 5.1 |
| L-Cysteine hydrochloride | 10.3 |
| Glycine | 5.1 |
| $\beta$-Alanine | 1.3 |

-Continued

| Ingredients | Parts |
| --- | --- |
| Taurine | 20.0 |
| Mixture of di-sodium inosinate and di-sodium guanylate | 3.3 |

The mixture is heated at 300°F for 30 seconds. After cooling to 100°F, 0.12 parts of diacetyl and 0.10 part of hexanal are added. After aging the resulting mixture for three hours 0.1 ppm of 1,5-pentanedithiol is added.

The resulting mixture is aged for 10 hours to provide a material having a sulfury, roasted meat aroma.

EXAMPLE V

| Ingredients | Parts |
| --- | --- |
| Vegetable shortening | 622.7 |
| Salt | 321.7 |
| Glutamic acid | 5.1 |
| L-Cysteine hydrochloride | 10.3 |
| β-Alanine | 1.3 |
| Taurine | 20.0 |
| Mixture of di-sodium inosinate and di-sodium guanylate | 3.3 |

The mixture is heated at 300°F for 30 seconds. After cooling to 100°F, 0.12 part of diacetyl and 0.10 part of hexanal are added. After aging the resulting mixture for three hours 0.5 ppm of 2-mercapto-3-butanol is added.

The resulting mixture is aged for 10 hours to provide a material having an excellent sweet meaty note.

EXAMPLE VI

| Ingredients | Parts |
| --- | --- |
| Vegetable shortening | 622.7 |
| Salt | 321.7 |
| Glutamic acid | 5.1 |
| L-Cysteine hydrochloride | 10.3 |
| β-Alanine | 1.3 |
| Taurine | 20.0 |
| Mixture of di-sodium inosinate and di-sodium guanylate | 3.3 |
| Di-α-methyl-β-mercapto propyl sulfide | 1 ppm |
| α-Methyl-β-mercapto-propyl-α'-methyl-β'-hydroxy-propyl sulfide | 1 ppm |

The resulting mixture has an excellent roasted meat aroma.

EXAMPLE VII

The following ingredients are homogeneously mixed at 77°C:

| Ingredients | Parts |
| --- | --- |
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 3.3 |

The mixture is heated to 300°F for 30 seconds. After cooling to 100°F, 0.12 part of diacetyl, 0.10 part of hexanal, 0.5 ppm of 1,2-ethanedithiol are added. The resulting mixture has an excellent roasted meat aroma.

EXAMPLE VIII

The following ingredients are homogeneously mixed at 77°C:

| Ingredients | Parts |
| --- | --- |
| Vegetable shortening | 622.7 |
| Salt | 321.7 |
| Glutamic acid | 5.1 |
| L-Cysteine hydrochloride | 10.3 |
| Glycine | 5.1 |
| β-Alanine | 1.3 |
| Taurine | 20.0 |
| Mixture of di-sodium inosinate and di-sodium guanylate | 2.0 |

The mixture is heated to 300°F for 60 seconds. After cooling to 100°F, 0.12 part of diacetyl and 0.10 part of hexanal are added. After aging the mixture for a period of three hours at a temperature of 65°F, 0.15 ppm of 1,3-butanedithiol are added. The resulting mixture is then aged for 10 hours to yield a composition having an excellent chicken broth flavor and aroma.

EXAMPLE IX a. Cysteine hydrochloride in the amount of 8.8g is refluxed at 215°F under atmospheric pressure for four hours with a mixture of 309g of hydrolyzed vegetable protein, 8.8g thiamine HCl, and 674g of water. Subsequent to the reflux, the mixture is cooled and 0.15 ppm of 2,3-butanedithiol is added and intimately admixed with the composition. The mixture has an excellent stewed beef flavor.

b. The beef favor produced in Example IX(a) is added to:
1. a commercial dry type pet food;
2. a semi-moist type pet food; and
3. wet or canned pet food.

When so added at levels of 0.5, 1, 1.5, 2, 2.5 and 3% (by weight of foodstuff) highly palatable pet foods are obtained.

EXAMPLE X

The composition prepared in Example III is dissolved in propylene glycol to provide a 0.1% solution. This solution in the amount of 0.966g is added to 7.3g of a soup base consisting of:

| Ingredients | Parts |
| --- | --- |
| Fine ground sodium chloride | 35.62 |
| Hydrolyzed vegetable protein | 27.40 |
| Monosodium glutamate | 17.81 |
| Sucrose | 10.96 |
| Beef fat | 5.48 |
| Caramel color | 2.73 |

The composition of Example IV (0.005g) when added to the above soup base also provides a soup having good meat flavor.

EXAMPLE XI

The composition prepared in Example VIII is dissolved in propylene glycol to provide an 0.1% solution. This solution in the amount of 0.966g is added to 7.3g of a soup base consisting of:

| Ingredients | Parts |
| --- | --- |
| Fine ground sodium chloride | 35.62 |
| Hydrolyzed vegetable protein (Maggi 4BE) | 27.40 |
| Monosodium glutamate | 17.81 |
| Sucrose | 10.96 |
| Chicken fat | 5.48 |
| Caramel color | 2.73 |

The resulting mixture is added to 12 ounces of boiling water to obtain a soup having an excellent chicken flavor.

The composition of Example V (0.005g) when added to the above soup base also provides a soup having good meat flavor.

EXAMPLE XII a. Preparation of Spray-Dried Product

The following ingredients are refluxed for 4 hours, aged for 3 days and spray-dried to produce a solid product having a beef flavor. Before drying sufficient gum arabic is added to provide a composition containing 0.5 parts gum arabic and one part flavor solid.

| Ingredients | Parts |
| --- | --- |
| L-Cysteine hydrochloride | 1.32 |
| Carbohydrate-free vegetable protein hydrolyzate | 22.05 |
| Ethyl thioacetate | 22.00 |
| Thiamine hydrochloride | 1.32 |
| α-alanine | 0.50 |
| Water | 53.31 | b. Preparation of Beef Gravy

A beef gravy concentrate is produced by formulating a gravy flavor composition of the ingredients and in the amounts indicated:

| Ingredients | Parts |
| --- | --- |
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |
| Toasted onion powder | 2.52 |
| White pepper | 0.36 |
| The spray-dried product of part XII (a) above | 5.40 |

To this mixture is added, at the rate of 0.5 ppm, 1,2-propanedithiol. The said dithiol improves the bloody, tangy beef extract flavor character of the mixture.

To one unit of said gravy flavor concentrate 24 ozs. of water are added, and the mixture is stirred thoroughly to disperse the ingredients, brought to a boil, simmered for 1 minute and served. The meatless gravy obtained shows excellent bloody, tangy beef extract flavor.

EXAMPLE XIII a. Preparation of Chicken Flavor

The following mixture is prepared:

| Ingredients | Parts |
| --- | --- |
| Fat | 640 |
| Sodium chloride | 320 |
| Glutamic acid | 5 |
| L-cysteine hydrochloride | 10 |
| β-alanine | 2 |
| Glycerine | 5 |
| Thiamine hydrochloride | 10 |
| Mixture of disodium inosinate and disodium guanylate | 4 |

The foregoing mixture is continuously fed to a scraped wall heat exchanger where it is heated for one-half minute at 325°F. The mixture is then immediately cooled at 100°F in a second scraped wall heat exchanger.

After cooling, 0.12 parts of diacetyl and 0.10 parts of hexanal are added. The mixture has a chicken flavor.

b. Preparation of Chicken Flavored Gravy

A mixture for the preparation of chicken flavored gravy is prepared by blending the following ingredients:

| Ingredients | Parts |
| --- | --- |
| Cornstarch | 29 |
| Flour | 21 |
| Chicken fat | 11 |
| Crisco brand of hydrogenated vegetable oil | 11 |
| Sodium chloride | 9 |
| Monosodium glutamate | 5 |
| Chicken flavor prepared in Part (a) of this Example | 7 |
| Sucrose | 2 |
| Onion powder | 0.50 |
| Tumeric | 0.05 |
| Celery seeds | 0.02 |
| White pepper | 0.02 |

To this mixture is added 0.5 ppm of 1,8-octanedithiol, 0.01 ppm of 1,4-butanedithiol and 0.15 ppm of 1,3-butanedithiol. The mixture of the above three dithiols imparts to this gravy mixture an intense excellent chicken meat flavor character.

About 10 parts of the gravy mixture is thoroughly dispersed in 10 parts of cooled water. The dispersion is then brought to a boil and simmered for 2 minutes. A gravy having an excellent chicken meat flavor is obtained.

EXAMPLE XIV a. Preparation of Flavor Mixture

The following mixture is prepared:

| Ingredients | Parts |
| --- | --- |
| 4-Methyl-5-β-hydroxyethyl thiazole | 53.0 |
| 5-Methyl furfural | 5.0 |
| 2,3-butanedithiol | 0.15 ppm |
| Guaiacol | 1.5 |
| Methyl mercaptan | .5 |
| Tetrahydrothiophen-3-one | 5.0 |
| Methional | 1.0 |
| Tetrahydrofurfuryl alcohol | 30.0 | b. Preparation of Soup

A beef noodle soup is prepared by mixing together:

| Ingredients | Parts |
|---|---|
| Sodium chloride | 50 |
| Mixture of Part (a) of this Example | 30 |
| Gelatin | 10 |
| Monosodium glutamate | 4 |
| Caramel color | 4 |
| Garlic powder | 1 |
| White pepper, ground | 6 |
| Mixed vegetable base | 360 |

Three cups of water are added to the above mixture and this mixture is brought to a full boil, simmered for five minutes and is then ready to serve.

The 2,3-butanedithiol imparts a beef stew note to the soup with a desirable brothy flavor.

EXAMPLE XV a. Preparation of Flavor Mixture

The following mixture is prepared:

| Ingredients | Parts |
|---|---|
| 4-Methyl-5-β-hydroxyethyl thiazole | 55.0 |
| 1,3-propanedithiol | 0.05 ppm |
| Amyl alcohol | 10.0 |
| Methional | 2.0 |
| Hexanal | 5.0 |
| Diacetyl | 10.0 |
| Ethyl disulfide | 3.0 | b. Preparation of Shake Composition

A "shake" composition for enhancing the flavor of meats is prepared by admixing the following ingredients:

| Ingredients | Parts |
|---|---|
| Tumeric | 25.0 |
| Paprika | 25.0 |
| Oregano | 15.0 |
| Monosodium glutamate (fine grind) | 25.0 |
| Sodium chloride (fine grind) | 550.0 |
| Mixture of Part (a) of this Example | 400.0 |

When sprinkled on meat the above mixture imparts thereto an oniony and meaty note effect and this effect is caused by the presence of 1,3-propanedithiol.

EXAMPLE XVI a. Preparation of Flavor Mixture

The following mixture is prepared:

| Ingredients | Parts |
|---|---|
| 4-Methyl-5-β-hydroxyethyl thiazole | 40.0 |
| 2-mercaptoethyl sulfide | 0.5 ppm |
| 2,6-Dimethyl pyrazine | 4.0 |
| Acetophenone | 2.0 |
| Guaiacol | 1.0 |
| Tetrahydrofurfuryl alcohol | 46.0 |
| 2-Methyl-2-butenal | 2.0 |
| Furfuryl mercaptan | 0.2 |
| Onion oil | 0.1 |
| Acetyl propionyl | 2.7 | b. Preparation of Beef Gravy

A beef gravy concentrate is made by formulating a gravy flavor composition of the ingredients and in the amounts indicated:

| Ingredients | Parts |
|---|---|
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |
| Toasted onion powder | 2.52 |
| White pepper | 0.36 |
| The mixture of Part (a) of this Example | 5.40 |

To one unit of gravy flavor concentrate 24 ozs. of water are added and the mixture is stirred thoroughly to disperse the ingredients, brought to a boil, simmered for 1 minute and served. This meatless gravy has an excellent roasted meat character primarily caused by the presence of the 2-mercaptoethyl sulfide included in the flavor mixture of Part (a) of this Example.

EXAMPLE XVII a. Preparation of Spray-Dried Product

The following ingredients are refluxed for 4 hours, aged for 3 days and spray-dried to produce a solid product having a beef flavor. Before drying sufficient gum arabic is added to provide a composition containing 0.5 parts gum arabic and one part flavor solid.

| Ingredients | Parts |
|---|---|
| L-cysteine hydrochloride | 1.32 |
| Carbohydrate-free vegetable protein hydrolyzate | 22.05 |
| Ethyl thioacetate | 22.00 |
| Thiamine hydrochloride | 1.32 |
| β-alanine | 0.50 |
| Water | 53.31 | b. Preparation of Beef Gravy

A beef gravy concentrate is produced by formulating a gravy flavor composition of the ingredients and in the amounts indicated.

| Ingredients | Parts |
|---|---|
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |

-Continued

| Ingredients | Parts |
| --- | --- |
| Toasted Onion powder | 2.52 |
| White pepper | 0.36 |
| The spray-dried product of Part XVII(a) above | 5.40 |

To this mixture is added, at the rate of 0.5 ppm, 1,2-ethanedithiol. The said ethanedithiol improves the roasted meat flavor character of the mixture.

To one unit of said gravy flavor concentrate 24 ozs. of water are added, and the mixture is stirred thoroughly to disperse the ingredients, brought to a boil, simmered for 1 minute and served. The meatless gravy obtained shows excellent roasted meat flavor.

EXAMPLE XVIII a. Preparation of Chicken Flavor

The following mixture is prepared:

| Ingredients | Parts |
| --- | --- |
| Fat | 640 |
| Sodium chloride | 320 |
| Glutamic acid | 5 |
| L-cysteine hydrochloride | 10 |
| β-alanine | 2 |
| Glycerine | 5 |
| Thiamine hydrochloride | 10 |
| Mixture of disodium inosinate and disodium guanylate | 4 |

The foregoing mixture is continuously fed to a scraped wall heat exchanger where it is heated for one-half minute at 325°F. The mixture is then immediately cooled at 100°F. in a second scraped wall heat exchanger.

After cooling, 0.12 parts of diacetyl and 0.10 parts of hexanal are added. The mixture has a chicken flavor.

b. Preparation of Chicken Flavored Gravy

A mixture for the preparation of chicken flavored gravy is prepared by blending the following ingredients:

| Ingredients | Parts |
| --- | --- |
| Cornstarch | 29 |
| Flour | 21 |
| Chicken fat | 11 |
| Crisco brand of hydrogenated vegetable oil | 11 |
| Sodium chloride | 9 |
| Monosodium glutamate | 5 |
| Chicken flavor prepared in Part (a) of this Example | 7 |
| Sucrose | 2 |
| Onion powder | 0.50 |
| Tumeric | 0.05 |
| Celery seeds | 0.02 |
| White pepper | 0.02 |

To this mixture is added 0.25 ppm of 3,3-dimethyl-2,2-butanedithiol, 0.5 ppm of 1,2-butanedithiol and 0.5 ppm of 1,9-nonanedithiol. The mixture of the above three dithiols imparts to this gravy mixture an intense chicken meat flavor character.

EXAMPLE XIX a. Preparation of Flavor Mixture

The following mixture is prepared:

| Ingredients | Parts |
| --- | --- |
| 4-Methyl-5-β-hydroxyethyl thiazole | 53.0 |
| 5-Methyl furfural | 5.0 |
| Di-α-methyl-β-mercapto propyl sulfide | 1 ppm |
| Guaiacol | 1.5 |
| Methyl mercaptan | .5 |
| Tetrahydrothiophen-3-one | 5.0 |
| Methional | 1.0 |
| Tetrahydrofurfuryl alcohol | 30.0 | b. Preparation of Soup

A beef noodle soup is prepared by mixing together:

| Ingredients | Parts |
| --- | --- |
| Maltol dextrin | 25 |
| Sodium chloride | 50 |
| Mixture of Part (a) of this Example | 5 |
| Gelatin | 10 |
| Monosodium glutamate | 4 |
| Caramel color | 4 |
| Garlic powder | 1 |
| White pepper, ground | 6 |
| Powdered mixed vegetable base | 360 |

Three cups of water are added to the above mixture and the mixture is brought to a full boil, simmered for 5 minutes and is then ready to serve.

The Di-α-methyl-β-mercapto-propyl sulfide imparts a meaty body to the soup with a desirable roasted chicken flavor.

EXAMPLE XX a. Preparation of Flavor Mixture

The following mixture is prepared:

| Ingredients | Parts |
| --- | --- |
| 4-Methyl-5-β-hydroxyethyl thiazole | 55.0 |
| Amyl alcohol | 10.0 |
| Methional | 2.0 |
| Hexanal | 5.0 |
| Diacetyl | 10.0 |
| Ethyl disulfide | 3.0 |
| α-Methyl-β-mercapto-propyl-α'-methyl-β'-hydroxy propyl sulfide | 1.0 ppm | b. Preparation of Shake Composition

A "Shake composition" for enhancing the flavor of meats is prepared by admixing the following ingredients:

| Ingredients | Parts |
| --- | --- |
| Tumeric | 25.0 |
| Paprika | 25.0 |
| Oregano | 15.0 |
| Monosodium glutamate (fine grind) | 25.0 |

-Continued

| Ingredients | Parts |
| --- | --- |
| Sodium chloride (fine grind) | 550.0 |
| Mixture of Part (a) of this Example | 5.0 |
| Maltol dextrin | 395.0 |

When sprinkled on meat the above mixture imparts thereto a roasted meat note effect and this effect is caused by the presence of α-methyl-β-mercaptopropyl-α'-methyl-β'-hydroxypropyl sulfide.

EXAMPLE XXI a. Preparation of Flavor Mixture

The following mixture is prepared:

| Ingredients | Parts |
| --- | --- |
| 4-Methyl-5-β-hydroxyethyl thiazole | 40.0 |
| 1,9-nonanedithiol | 0.5 ppm |
| 2,6-Dimethyl pyrazine | 4.0 |
| Acetophenone | 2.0 |
| Guaiacol | 1.0 |
| Tetrahydrofurfuryl alcohol | 46.0 |
| 2-Methyl-2-butenal | 2.0 |
| Furfuryl mercaptan | 0.2 |
| Onion oil | 0.1 |
| Acetyl propionyl | 2.7 | b. Preparation of Beef Gravy

A beef gravy concentrate is made by formulating a gravy flavor composition of the ingredients and in the amounts indicated.

| Ingredients | Parts |
| --- | --- |
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |
| Toasted onion powder | 2.52 |
| White pepper | 0.36 |
| The mixture of Part (a) of this Example | 5.40 |

To one unit of gravy flavor concentrate 24 ozs. of water are added and the mixture is stirred thoroughly to disperse the ingredients, brought to a boil, simmered for one minute and served. This meatless gravy has an excellent burnt meaty character primarily caused by the presence of the 1,9-nonanedithiol included in the flavor mixture of Part (a) of this Example.

EXAMPLE XXII

Preparation of 2-Methyl-1,3-Butane Dithiol

In a 3-necked, 500 ml. round-bottomed photolysis flask equipped with a magnetic stirring apparatus, a water-cooled reflux condenser and a UV photolysis cell was placed 152 g (2 moles) of thiolacetic acid and 68 g (1 mole) of isoprene. It was photolyzed with stirring at room temperature under UV radiation from a "Nester Faust" low pressure UV lamp via a quartz tube for 3 days and 2 nights, at the end of which time it was set up for fractional vacuum distillation through a 30 cm. column packed with 5 × 5 Raschig rings. A vacuum of 3 mmHg was pulled and fraction one was collected boiling between 25° and 90°C. The raw distillation was stopped at this point. The fraction collected was discarded since it consisted of unreacted isoprene and raw thiolacetic acid. Approximately 100 grams of the residue was mixed with approximately 50 ml of Primol high viscosity mineral oil and transferred to a bantamware distillation apparatus. Under a vacuum of 1 mmHg, three fractions were collected boiling between 102° and 107°C. The residue was discarded. The three fractions totalled approximately 85 g. The three fractions were combined and mixed with 45 g of potassium hydroxide, 250 ml. of water and 400 ml of ethanol and refluxed for 1 hour. The reaction mix was cooled to room temperature and the ethanol stripped off on the rotary evaporator. The aqueous residue was neutralized with HCl (conc.) and extracted 2 times with ether, which was dried over $Na_2SO_4$ (anhyd.) and concentrated on the rotary evaporator. Preparatory gas liquid chromatography on 8 feet × ¼ inch glass 5% Carbowax 20M (polyethylene glycol terminated with terephtalic acid) was used to recover 2-methyl-1,3-butane dithiol and its structure was confirmed by mass spectral analysis, and NMR spectroscopy.

EXAMPLE XXIII

Preparation of 3-Methyl-1,5-Pentanedithiol

In a 250 ml, 3-necked round-bottomed flask equipped with an immersion thermometer, a mechanical stirring apparatus, a water-cooled reflux condenser and a 250 ml addition funnel was mixed 30 ml $H_2O$ and 46 grams of thiourea. The mixture was heated to reflux and 50 grams of 3-methyl-1,5-dibromopentane was added during 1 hour. The reflux was continued overnight and the next morning the viscous reaction mix was cooled to room temperature and 56 grams of KOH in 100 ml $H_2O$ was added. The reaction mix was refluxed under a $N_2$ atmosphere for 5 hours then cooled to room temperature. A grayish precipitate had formed in a yellowish liquid. The precipitate was filtered off and discarded. The filtrate consisted of two layers which were separated in a separatory funnel. The oil layer was dried over anhydrous $Na_2SO_4$ and the aqueous layer was acidified (pH6) with concentrated HCl during which more of the grayish precipitate was formed. The mixture was extracted once with ether. The extract was dried and concentrated. There was negligible residue which was therefore discarded. The 3-methyl-1,5-pentanedithiol was separated from the dried oil layer by preparative gas liquid chromatography on an 8 feet × ¼ inch glass 5% Carbowax 20M (polyethylene glycol-terephthalic acid terminated) column and its structure was confirmed by mass spectral analysis and NMR spectroscopy.

EXAMPLE XXIV

Preparation of 2,3-Butanedithiol and α-Methyl-β-Mercapto-Propyl-α'-Methyl-β'-Hydroxy Propyl Sulfide, and di-α-Methyl-β-Mercapto-Propyl Sulfide and 2-Mercapto-3-Butanol In a 2 liter Erlenmayer flask was dissolved at room temperature 184 gms. of ammonium thiocyanate in 400 ml. of $H_2O$; 152 grams of 2,3-epoxy butane was added by slowly pouring it in. The flask was stoppered, gently slurried and placed in the hood where it remained for 3 days. A light brown oil phase separated out which was removed in a separatory funnel. This was slowly poured into a solution of 250 grams of NaSH × $H_2O$ in 1500 ml of 95% ethanol. The reaction mixture was allowed to stand overnight. It was next divided into three equal parts. Each was mixed with four volumes of water and extracted once with 200 ml of ether. The combined ethers were back-extracted once in 1N KOH. The aqueous phases were acidified (pH 5) with concentrated HCl and extracted twice with ether. The alkaline ether extract was dried and concentrated to a yellow oil. The acid ether was dried and concentrated to a light yellow oil. Gas liquid chromatography on the acid ether extract showed several large peaks. Each was trapped for analysis. Trap No. 2 was 2,3-butanedithiol. Trap No. 1 was 2-mercapto-3-butanol. Trap No. 3 was α-methyl-β-mercapto-propyl-α'-methyl-β'-hydroxy propyl sulfide. Trap No. 4 was di-α-methyl-β-mercapto propyl sulfide. Trap No. 5 was identical to the major component from the alkaline ether extract and was identified as 3,4,6,7-tetramethyl-1,2,5-trithiepane. The structures of the compounds were confirmed by mass spectral analysis and NMR spectroscopy.

What is claimed is:

1. A process for altering the organoleptic properties of a foodstuff which comprises adding thereto an effective amount of a sulfur-containing compound of the formula

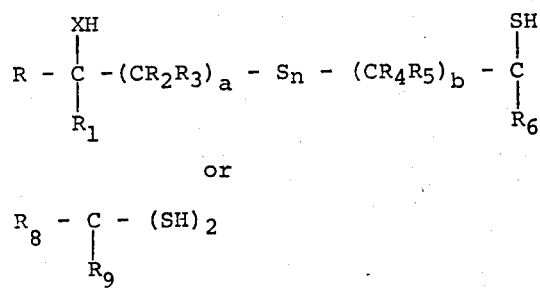

or

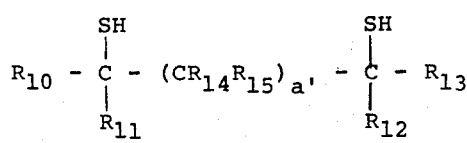

wherein X is oxygen or sulfur, each of R through $R_9$ is the same or different and each is hydrogen or lower alkyl of 1–4 carbon atoms, and at least one of $R_8$ or $R_9$ is such lower alkyl; and when $n$ is 0, then $b$ is 0 and $a$ is an integer of from 0 to 7; and when $n$ is 1, $a$ and $b$ are the same and each represents an integer of 1.

2. The process of claim 1 wherein said compound is of the formula

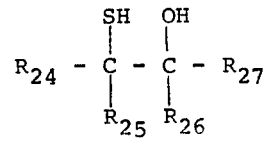

wherein $a'$ is 0 through 7, each of $R_{10}$ through $R_{15}$ is the same or different and each is hydrogen or lower alkyl of from 1 to 3 carbon atoms.

3. The process of claim 2 wherein said compound is 1,2-ethanedithiol.

4. The process of claim 2 wherein said compound is 2,3-butanedithiol.

5. The process of claim 2 wherein said compound is 1,6-hexanedithiol.

6. The process of claim 1 wherein said compound is represented by the formula

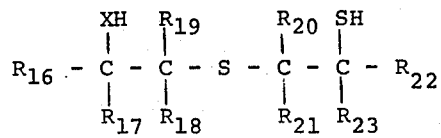

wherein X is sulfur or oxygen, and each of $R_{16}$ through $R_{23}$ is the same or different and each is hydrogen or lower alkyl of from 1–3 carbon atoms.

7. The process of claim 6 wherein said compound is di-α-methyl-β-mercapto propyl sulfide.

8. The process of claim 6 wherein said compound is α-methyl-β-mercapto-propyl-α'-methyl-β'-hydroxy propyl sulfide.

9. The process of claim 6 wherein said compound is 2-mercaptoethyl sulfide.

10. The process of claim 1 wherein said compound is represented by the formula

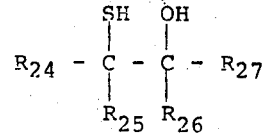

wherein each of $R_{24}$ through $R_{27}$ is the same or different and each is hydrogen or lower alkyl of from 1 through 3 carbon atoms.

11. The process of claim 10 wherein said compound is 2-mercapto-3-butanol.

12. The process of claim 1 wherein said compound is 3,3-dimethyl-2,2-butane dithiol.

13. A flavor altering composition comprising at least one sulfur-containing compound of the formula

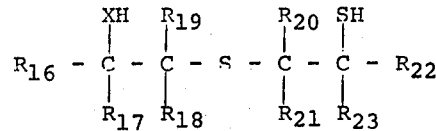

wherein X is sulfur or oxygen, and each of $R_{16}$ through $R_{23}$ is the same or different and each is hydrogen or lower alkyl of from 1 through 3 carbon atoms, and an auxiliary flavoring adjuvant selected from the group consisting of stabilizers, flavorants, and flavor intensifiers.

14. A flavor altering composition comprising at least one sulfur-containing compound of the formula

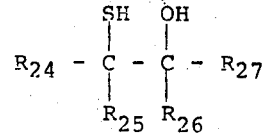

wherein each of $R_{24}$ through $R_{27}$ is the same or different and each is hydrogen or lower alkyl of from 1 through 3 carbon atoms, and an auxiliary flavoring adjuvant selected from the group consisting of stabilizers, flavorants, and flavor intensifiers.

* * * * *

UNITED STATES PATENT OFFICE
CERTIFICATE OF CORRECTION

PATENT NO. : 3,892,878
DATED : July 1, 1975
INVENTOR(S) : RICHARD A. WILSON and CHRISTOPHER GIACINO It is certified that error appears in the above-identified patent and that said Letters Patent are hereby corrected as shown below:

Col. 11, Example XII, in the tabulation under "Ingredients", "$\alpha$-alanine" should read -- $\beta$-alanine--.

Signed and Sealed this sixth Day of January 1976

[SEAL]

Attest:

RUTH C. MASON
Attesting Officer

C. MARSHALL DANN
Commissioner of Patents and Trademarks